Feb. 13, 1973  H. D. CRIPPEN  3,716,172
AUTOMATIC FEEDER DEVICE

Filed Sept. 3, 1970  2 Sheets-Sheet 1

INVENTOR
HUSTON D. CRIPPEN
BY *Isons, Stockman, Sears & Santorelli*
ATTORNEYS

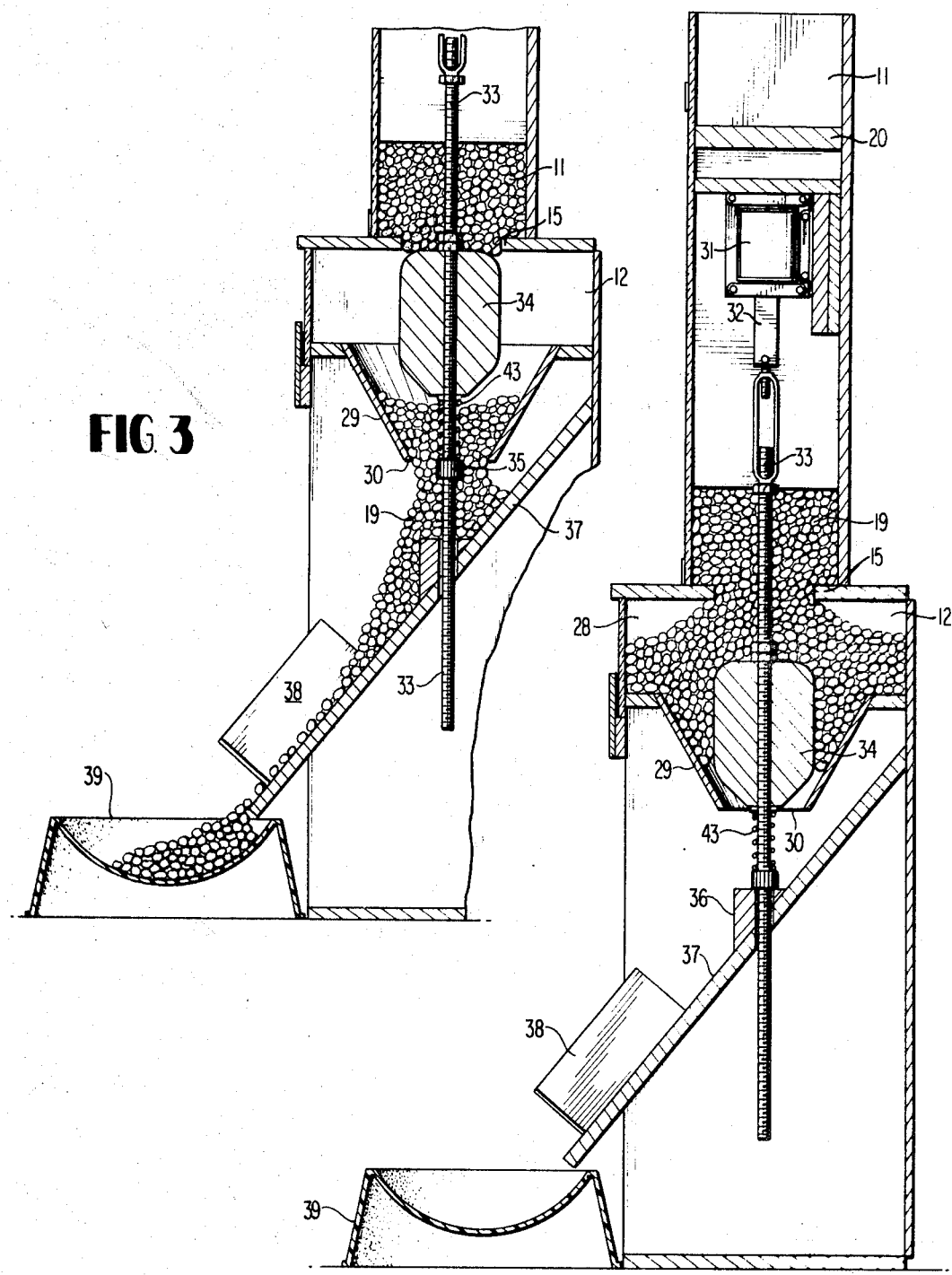

United States Patent Office 3,716,172
Patented Feb. 13, 1973

3,716,172
AUTOMATIC FEEDER DEVICE
Huston D. Crippen, Esmont, Va., assignor to Coleswood Products, Inc., Esmont, Va.
Filed Sept. 3, 1970, Ser. No. 69,237
Int. Cl. A01k 5/02
U.S. Cl. 222—453
1 Claim

ABSTRACT OF THE DISCLOSURE

An automatic particulate material dispensing device for dispensing predetermined quantities of material such as particulate feed material at regular intervals for access by animals such as livestock, pets and the like. The dispensing device includes an upper material receiving chamber having a housing structure therein provided with a generally V-shaped bottom configuration which cooperates with inclined surfaces at the bottom of the receiving chamber to form a pair of inclined passageways leading to a discharge opening at the bottom of the chamber whereby the feed material is discharged into a material measuring and dispensing compartment for subsequent dispensing. The housing structure has an inverted V-shaped configuration on its upper end constituting baffle means to break up and divide the flow of particulate material to each of the passageways. A valve located in the compartment is operated by a solenoid located within the housing structure. A valve stem connects the valve to the solenoid and extends through the receiving chamber discharge opening, whereby the valve stem assists in preventing clogging or bridging of material.

BACKGROUND OF THE INVENTION

Field of invention

This invention relates generally to the field of dispensers for animal feed and particularly to disepnsers for automatically delivering predetermined quantities of particulate feed material at regularly timed intervals

Description of the prior art

With the development of pelletized feed material for animals a need has arisen for devices for conveniently and automatically dispensing such pelletized or particulate feed material at regular intervals prior art devices heretofore known have encountered difficulty in handling such particulate feed material in that the particles of the material tend to bridge various passageways and openings in the dispensing devices, thus clogging the devices and preventing an efficient and effective dispensing of a desired amount of material. Moreover, such prior art devices have been relatively complicated and expensive to build and operate. One type of automatic feed dispensing device heretofore known in the prior art is described in my previous patent, 3,375,856 issued Apr. 9, 1968. While the structure shown in that patent is effective for handling particulate feed material, particularly in larger operations, the present invention represents an improvement on that sructure which is more readily adaptable to smaller operations

SUMMARY OF THE INVENTION

Among the objects of the present invention is to avoid the disadvantages of prior art particulate material dispensing devices and provide an improved particulate material feed dispenser particularly adapted to dispense animal feed wherein an effective, dependable dispensing of predetermined quantities of feed at regular timed intervals is effected. In this regard it is a particularly important object of the invention to provide such a dispenser which is simple in construction and yet contains means for preventing clogging or bridging of material within the dispenser whereby the delivery of the material being dispensed is insured each time the dispenser is actuated.

It is another important object of the invention to provide a dispenser which includes a timing device for insuring that the desired amount of material is regularly and accurately dispensed at the required time periods. A further object of the invention is to provide a dispensing device which is simple in construction, requires little maintenance and is effectively and easily operated automatically.

According to the present invention there is provided a particulate material dispensing device which includes an upper material receiving chamber having a discharge opening at the bottom thereof and a pair of inclined surfaces forming a generally V-shaped configuration leading to the opening. Mounted within the chamber is a housing structure having a similar V-shaped configuration on its lower end and which is spaced from the bottom of the chamber, whereby the bottom walls of the housing structure are generally in parallel relationship with the inclined surfaces to form a pair of passageways on oposite sides of the chamber for delivering feed material to the discharge opening. The housing structure has an inverted V-shaped configuration on its upper end which constitutes baffle means to break up and divide the flow of particulate material to each passageway. A material measuring and dispensing compartment, located beneath the opening of the material receiving chamber, is provided with a dispensing outlet for the dispensing of material therefrom. A solenoid is mounted within the housing structure and is connected to a valve operable to alternately open and close the discharge opening and the dispensing outlet by a valve stem which extends through the discharge opening and is connected to the valve in the dispensing compartment. In one embodiment of the invention the valve is spring biasedly mounted on the valve stem.

BRIEF DESCRIPTION OF THE DRAWINGS

Other objects and advantages of the invention will become apparent by reference to the detailed description of the invention and the accompanying drawings which follow wherein:

FIG. 2 is a cross-sectional view taken along line 2—2 of FIG. 1 showing the valve in a closed or non-dispensing position;

FIG. 3 is a partial cross-section of the view shown in FIG. 2 illustrating the valve in an opened or dispensing position;

DESCRIPTION OF THE PREFERRED EMBODIMENTS

Figure 1:
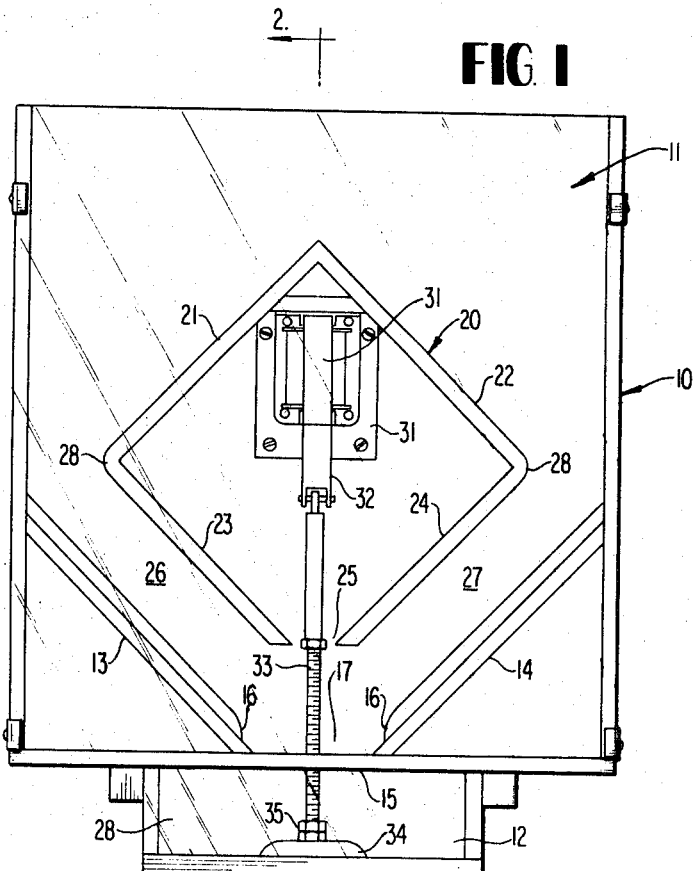
FIG. 1 is a front elevational view of the automatic dispensing device constructed according to the principles of the present invention.

Referring to the drawings, there is shown a device generally designated by the numeral 10, for automatically dispensing predetermined quantities of particulate feed materials 19 or the like. The dispensing device 10 comprises an uper material receiving and storage chamber 11 and a material measuring and dispensing compartment 12.

A pair of inclined surfaces or walls 13 and 14 are provided at the bottom of chamber 11 and positioned to form a generaly V-shaped configuration leading to a discharge opening 15 at the bottom of the chamber. As shown in FIG. 1 the inclined surfaces or walls 13 and 14 are located in perpendicular intersecting planes. Moreover, the bottom end of each wall 13 and 14 is chamfered as at 16 to form a material receiving cavity 17 immediately above discharge opening 15.

Mounted within chamber 11 is a housing structure, generally indicated by the numeral 20, positioned near the bottom of the chamber. As best shown in FIG. 1, housing structure 20 preferably is diamond shaped and is comprised of two downwardly and outwardly inclined upper walls 21 and 22 which are positioned to form an inverted V shaped configuration on the upper side of the housing 20 and a pair of lower walls 23 and 24 inclined downwardly and inwardly to form a generally V shaped configuration on the bottom of housing 20. Walls 23 and 24 are spaced at their lower end to define an opening or slot 25. Lower walls 23 and 24 are in generally parallel relationship with inclined surfaces or walls 13 or 14 and spaced therefrom to form a pair of passageways 26 and 27 inclined downwardly to cavity 17 and discharge opening 15.

Upper walls 21 and 22 constitute baffle means to break up and divide the flow of particulate material through chamber 11 whereby approximately one-half of the feed material goes down either side of the housing structure 20 and into inclined passageways 26 and 27. The provision of such inclined baffle means directs the weight of the feed material to either side thereby putting less weight and less force on the feed material in the bottom portion of chamber 11. Similarly, the inclined passageways 26 and 27 function to direct the weight of the feed material sideways as opposed to a straight vertical drop thereby again putting less weight and less force on the material at the bottom of the passageways to prevent bridging or clogging of the material. Accordingly, bridging or clogging of the feed material in the chamber is prevented.

As shown in FIG. 1, the inclined passageways 26 and 27 as well as lower walls 23 and 24 and inclined surfaces 13 and 14 preferably are at an angle of 45 degrees with the bottom of chamber 11. The outer corners 28 of housing structure 20 are rounded to facilitate the passage of particulate feed material without clogging or bridging. In this connection it is important in preventing clogging or bridging that the opening between corners 28 and the walls of chamber 11 not be too great in relation to the upper portion of chamber 11 and passageways 26 and 27. In a preferred embodiment of the invention, this opening should be approximately the same size as the cross-sectional area of each of the passageways 26 and 27.

The positioning of passageways 26 and 27 at an angle of 45 degrees greatly facilitates the gravitational movement of the particulate feed material downwardly in such a manner as to prohibit clogging or bridging of the particulate material in the passageways. Moreover, the rounding of corners 28 on the housing 20 and of chamfered edges 16 at the lower end of walls 13 and 14 further facilitates the flow of the particulate feed material while prohibiting clogging or bridging thereof.

Material measuring and dispensing compartment 12 situated immediately below chamber 11 is comprised of an upper storage area 28 and a lower frusto-conical hopper 29 having a dispensing outlet 30 at the bottom thereof. Dispensing outlet 30 of hopper 29 further functions as a valve seat.

Mounted within housing structure 20 is a solenoid 31 having an armature 32 connected to a threaded valve stem 33 which extends downwardly through slot 25, cavity 17 and discharge opening 15 to be connected to a valve 34 generally positioned within compartment 12. Alternatively, in place of a solenoid, suitable motor means may be employed to reciprocate or move valve 34. In the embodiment of the invention shown in FIGS. 1–3, the valve 34 is adjustably connected to valve stem 33 by suitable upper and lower lock nuts 35. Moreover, a compression spring 43 is provided between the lower lock nut 35 and the bottom of the valve 34 to bias the valve against the upper lock nuts. Accordingly, the position of valve 34 may be adjusted upwardly or downwardly by suitable adjustment of the nuts 35 to insure that the valve effectively stops the flow of material through dispensing outlet 30 when the valve is in a non-dispensing position and through discharge opening 15 when the valve is in a dispensing position.

When the solenoid 31 is activated, the spring 43 permits the stem 33 to initially move upwardly while the valve 34 remains temporarily relatively stationary. The spring 43, therefore, initially is compressed against the valve 34, thus permitting the valve stem to move upwardly without correspondingly initially moving the valve against the feed material. Accordingly, less force is required by the solenoid to initially move the valve, thereby permitting the use of a lighter duty solenoid. After the initial upward movement of the valve stem 33, the compression force of the spring 43 assists in moving the valve 34 upwardly against the feed material. Moreover, the spring 43 provides sufficient play in movement of the valve 34 with respect to the stem 33 to permit the valve 34 to effectively seat in discharge opening 15 without crunching the feed material. This is particularly advantageous where pelletized feed material is employed.

By positioning the solenoid inside housing structure 20 so that the valve stem 33 extends downwardly through discharge opening 15 to connect with valve 34, vertical movement of the valve stem as the valve is operated between a dispensing and non-dispensing position functions to agitate particulate feed material within cavity 17 and discharge opening 15 to prevent clogging or bridging of the feed material. In the embodiment of the device shown in FIGS. 1–3, valve stem 33 extends downwardly through the valve 34 and through a hole in a boss 36 mounted on an inclined dispensing surface or chute 37. The lower end of dispensing chute 37 may be provided with side boards 38 to direct the particulate material being dispensed into a suitable container such as tray 39.

Figure 5:
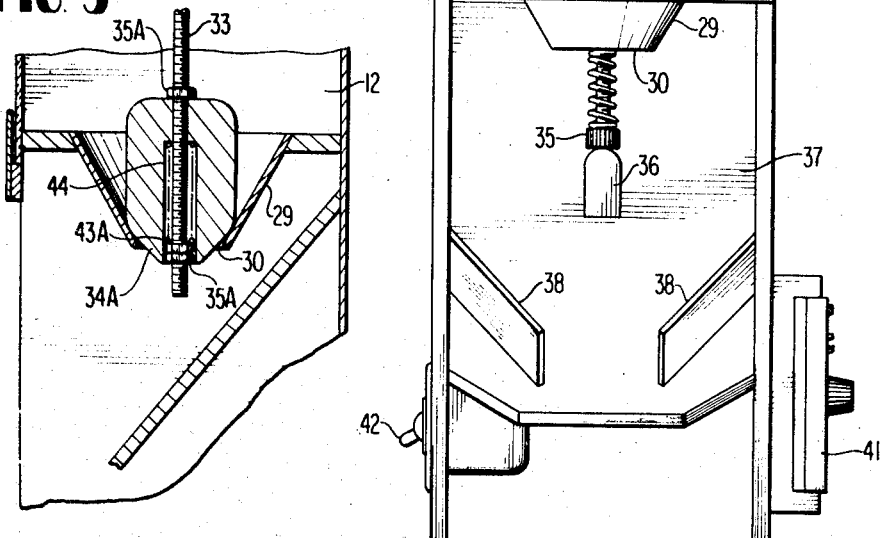
FIG. 5 is a partial cross-sectional view showing a modification of an alternate valve strucutre.

A preferred form of valve construction is shown in FIG. 5 wherein the valve 34A is spring biasedly mounted on the valve stem 33. The valve 34A is provided with an enlarged core 44 extending part way through the valve from the bottom thereof to a point intermediate of its length. Mounted within the core 44 is a compression spring 43A which is held between the top of the core 44 and lower lock nuts 35A threaded onto the valve stem and positioned to retain the spring within the core. An upper lock nut 35A is adjustably threaded onto the valve stem above the valve to position valve on the stem. This embodiment of the invention permits a more compact unit having less weight since, if desired, the valve stem may be shortened as shown in FIG. 5 so as not to extend downwardly through chute 37. Spring 43 thus biases the valve against the upper lock nut 35A and functions essentially in the same manner as in the previously described valve construction.

Figure 4:
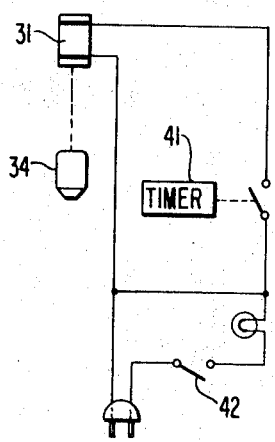
FIG. 4 is a schematic diagram showing the manner in which the timer and solenoid are connected into the electrical circuit of the invention.

A conventional timer mechanism generally indicated by the numeral 41 may be mounted in any suitable position on the device 10 for controlling the energization of the solenoid at regular, predetermined intervals to effect vertical movement of the valve 34 and the consequent dispening of material at the desired time. As shown in FIG. 4, the timer 41 is included in a suitable electrical circuit with the solenoid 31. As shown in FIG. 4, a manual switch 42 is connected in the electrical circuit with the solenoid and timer mechanism to manually control operation of the solenoid if desired.

Compartment 12 should be of sufficient size as shown in FIG. 2 to provide excess space for the feed material 19 to expand into when the valve 34 is moved from the non-dispensing position of FIG. 2 to the dispensing position of FIG. 3. If desired, hopper 29 may be adjusted downwardly or upwardly to vary the capacity of compartment 12 by any suitable means such as pegs or bolts which may extend through openings in the lower walls of the dispensing device 10. If the size of the compartment 12 is varied, the length of the valve 34 must be varied correspondingly to insure that it will effectively close discharge opening 15 when in the dispensing position and dispensing outlet 30 when in the non-dispensing position.

If desired, the front of both the material receiving and storage chamber 11 and the material measuring and dispensing compartment 12 may be covered with glass or other transparent material to permit visual observation of the level of feed material within the device.

In operation of the dispensing device of the present invention, the particulate feed material is added at the top of chamber 11 from any suitable source. As the material descends into chamber 11 the inverted V shaped configuration of the top of housing structure 20 divides the particulate material so that approximately equal amounts descend by gravitational movement on either side of the structure down walls 21 and 22 and around corners 28 into inclined passageways 26 and 27.

When the valve 34 is in its non-dispensing position, as shown in FIG. 2, the feed material descends from passageways 26 and 27 into cavity 17 and through discharge opening 15 into the material measuring and dispensing compartment 12. As further shown in FIG. 2, the feed material forms a generally cone shaped configuration from discharge opening 15 down to a point midway of upper storage area 28 of compartment 12. When the flow of feed material stops, the compartment 12 contains the desired amount of feed material to be dispensed.

Upon automatic operation of the timing device, or if desired by manual operation of switch 42, the solenoid 31 is energized, causing armature 32 to retract and raise valve stem 33 and valve 34 to the position shown in FIG. 3 whereby valve 34 effectively seats within discharge opening 15 to preclude the flow of any further feed material into compartment 12. The feed material in compartment 12 then flows by gravitational movement out through dispensing outlet 30 on to dispensing chute 37 into receptacle 39. The movement of valve stem 33 through discharge opening 15 facilitates the flow of material through the opening and thereby prevents clogging or bridging of the material to insure a steady flow therethrough. Thus, it can be seen that valve 34 alternately acts to close the dispensing outlet 30 when the valve is in a non-dispensing position and functions to close discharge opening 15 when the valve is in a dispensing position. When the valve 34 is in the dispensing position, dispensing outlet 30 is then opened to permit feed material to be dispensed to container 39.

The present invention permits livestock, pets or the like to be fed accurate predetermined amounts of feed at regular intervals without the necessity for any operator being present to commence operation of the device. This feature permits animal owners to leave the animals unattended for extended periods of time with the assurance the animals are being properly fed.

It is to be understood that the invention is not limited to the particular embodiments described and shown herein and that it includes any modifications or equivalents within the scope of the appended claim.

I claim:
1. A particulate material dispensing device comprising a material receiving chamber having an opening at the bottom for the discharge of material therefrom,
a pair of inclined surfaces at the bottom of said chamber which form a generally V-shaped configuration leading to said opening,
a housing structure mounted within said chamber, said housing structure having bottom walls forming a generally V-shaped configuration on its lower end and being spaced from the bottom of said chamber whereby said walls are in generally parallel relationship with said inclined surfaces to form a pair of inclined passageways on opposite sides of said chamber leading to said opening,
said housing further including particulate material bridging preventing means comprising top walls forming an inverted V-shaped configuration which break up and divide the flow of particulate material passing through said material receiving chamber to cause approximately equal amounts of said material to flow to each of said passageways in such a manner as to also prohibit bridging in said passageways,
a material measuring and dispensing compartment disposed beneath said opening and having a dispensing outlet in vertical alignment with said opening for the discharge of material therefrom,
valve means operable to alternately open and close said opening and said dispensing outle to control the dispensing of material from said device,
a solenoid mounted in said housing structure for reciprocally operating said valve means,
said valve means including a valve stem connected at one end to said solenoid and extending downwardly through said opening and said dispensing outlet and a valve mounted on said valve stem,
said valve including an enlarged core extending part way therethrough from the bottom to a point intermediate of its length,
and spring means positioned within said core on said valve stem biasing said valve upwardly,
said valve being reciprocally movable from a non-dispensing position closing said outlet while permitting said compartment to be filled with material to be dispensed to a dispensing position closing said opening while permitting material to be dispensed through said outlet.

References Cited
UNITED STATES PATENTS

| 3,376,856 | 4/1968 | Crippen | 119—52 A F |
| 742,935 | 11/1903 | Ward et al. | 222—547 X |
| 1,051,736 | 1/1913 | Holder | 222—453 X |
| 2,366,343 | 1/1945 | Ludwig | 222—453 |

SAMUEL F. COLEMAN, Primary Examiner

T. E. KOCOVSKY, Assistant Examiner

U.S. Cl. X.R.
119—51.11, 52 AF; 222—547